(12) United States Patent
Regnard et al.

(10) Patent No.: US 11,927,133 B2
(45) Date of Patent: Mar. 12, 2024

(54) ACOUSTIC ATTENUATION ON A TURBINE ENGINE WALL

(71) Applicant: SAFRAN AIRCRAFT ENGINES, Paris (FR)

(72) Inventors: Josselin David Florian Regnard, Moissy-Cramayel (FR); Norman Bruno André Jodet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 1428 days.

(21) Appl. No.: 16/158,524

(22) Filed: Oct. 12, 2018

(65) Prior Publication Data

US 2019/0112979 A1   Apr. 18, 2019

(30) Foreign Application Priority Data

Oct. 12, 2017   (FR) ...................................... 1759560

(51) Int. Cl.
*F02C 7/045* (2006.01)
*B64C 1/40* (2006.01)
(Continued)

(52) U.S. Cl.
CPC .............. *F02C 7/045* (2013.01); *B64C 23/00* (2013.01); *B64D 33/02* (2013.01); *F02K 1/827* (2013.01); *F02K 3/06* (2013.01); *G10K 11/16* (2013.01); *G10K 11/161* (2013.01); *G10K 11/162* (2013.01); *B64C 1/40* (2013.01);
(Continued)

(58) Field of Classification Search
CPC .......... F01D 5/145; F01D 5/183; F01D 5/184; F05D 2260/96; F05D 2260/963; F05D 2300/514; F02C 7/045; F02K 2/187; G10K 11/161; G10K 11/162; B64C 23/00; B64C 1/40; B64D 33/02; B64D 2033/0206
See application file for complete search history.

(56) References Cited

U.S. PATENT DOCUMENTS

| | | | |
|---|---|---|---|
| 4,465,725 A | 8/1984 | Riel | |
| 5,041,323 A * | 8/1991 | Rose | B32B 3/266 |
| | | | 428/116 |

(Continued)

FOREIGN PATENT DOCUMENTS

| | | |
|---|---|---|
| EP | 0913326 A2 | 5/1999 |
| EP | 1456510 | 9/2004 |

(Continued)

OTHER PUBLICATIONS

French Application No. 1759560, Search Report and Written Opinion dated May 7, 2018, 9 pgs. (in French, relevance found in citations).

*Primary Examiner* — Christopher Verdier
(74) *Attorney, Agent, or Firm* — Cozen O'Connor (57) ABSTRACT

An acoustic attenuation liner includes
a porous coating with a mesh structure,
an acoustically absorbent material covered with the porous coating and having a first volume, and
at least one cavity created between the acoustically absorbent material and the porous coating and which has a second volume, such as Vcav>3%,
wherein the mesh structure has wires separating between them openings passing through the structure, some of which have, when flat, a minimum elementary surface area.

18 Claims, 3 Drawing Sheets

(51) Int. Cl.
    *B64C 23/00*     (2006.01)
    *B64D 33/02*     (2006.01)
    *D06N 3/00*     (2006.01)
    *F02C 7/24*     (2006.01)
    *F02K 1/82*     (2006.01)
    *F02K 3/06*     (2006.01)
    *G10K 11/16*     (2006.01)
    *G10K 11/162*     (2006.01)

(52) U.S. Cl.
    CPC .... *B64D 2033/0206* (2013.01); *D06N 3/0006* (2013.01); *D06N 2209/025* (2013.01); *F02C 7/24* (2013.01); *F05D 2220/323* (2013.01); *F05D 2260/96* (2013.01); *F05D 2300/514* (2013.01); *F05D 2300/611* (2013.01)

(56) References Cited

U.S. PATENT DOCUMENTS

| | | |
|---|---|---|
| 2003/0118762 A1 | 6/2003 | Brown et al. |
| 2009/0169913 A1 | 7/2009 | Mueller |
| 2013/0153331 A1* | 6/2013 | Schneider ............. E04B 1/8409 181/292 |
| 2013/0186707 A1* | 7/2013 | Richter ................... F02K 1/827 181/292 |
| 2019/0211748 A1* | 7/2019 | Pastouchenko ........ B64D 33/02 |

FOREIGN PATENT DOCUMENTS

| | | |
|---|---|---|
| EP | 2833356 A2 | 2/2015 |
| FR | 2957894 A1 | 9/2011 |
| FR | 3001324 A1 | 7/2014 |
| GB | 2349445 A | 1/2000 |
| WO | WO 2010/012900 A2 | 2/2010 |
| WO | WO 2014114893 A1 | 7/2014 |

\* cited by examiner

ACOUSTIC ATTENUATION ON A TURBINE ENGINE WALL

CROSS-REFERENCE TO RELATED APPLICATION

This application claims priority to French Patent Application No. 1759560, filed Oct. 12, 2017, which is incorporated herein by reference.

SUMMARY OF THE INVENTION

The field of the present invention is that of aircraft and more specifically that of noise generated by aircrafts and their turbine engines.

The noise generated by aircraft, typically civil aircraft, particularly during take-off, is a nuisance.

Strict standards have been imposed in order to limit this nuisance, particularly that suffered by those living close to airports.

Furthermore, adjustments on an outside surface of the aircraft, particularly that of the turbine engines, have been developed. Indeed, when a turbine engine is running, the interaction between the flow and the solid components of the turbine engine generate noise that propagates around and particularly on either side of the turbine engine.

A means to attenuate this acoustic radiation is to incorporate a treatment on the surfaces in contact with the sound waves.

In addition, for new turbine engine designs, the trend is moving towards reducing the side of the nacelles equipping the turbine engines with a view to optimising propulsion efficiency.

In response to these constraints, it becomes necessary to optimise incorporation of the treatment on varying surfaces, including some surfaces that have been little used or not used up to now.

Hence, a technology allowing acoustic treatment of the edges, such as but not only the leading edges, installed on walls of aircraft turbine engines, is involved here.

In the field, patent FR2957894 offers a solution based on use of an absorbent material to attenuate the engine noise.

An acoustic attenuation edge, also called liner, is presented therein. Such an acoustic attenuation edge/liner is designed to be installed on an aircraft turbine engine wall, in contact with a fluid flow, with a view to attenuating at least one acoustic wave, wherein said liner comprises:
  a porous coating having a mesh structure and
  an acoustically absorbent material covered with the porous coating.

In patent FR2957894, the porous coating usefully serves both to protect the absorbent material (aerodynamic stresses and external attacks) and to structure the leading edge defined, or at least partly formed, by the edge thus constituted. The function of the absorbent material is to attenuate the acoustic waves. It is often characterised by its impedance. Common impedance values vary between 0.3 and 5 pc (where pc is the impedance of air in the propagation medium).

However, in addition to the fact that the absorbent material is located on a turbine engine mounting pylon, the patent does not mention any "circulation" phenomenon identified below in the present application. It does not therefore devote any attention to solutions to improve the situation in this respect.

It occurs however that for the sake of ease of implementation of the above technology, it is known to provide for play between the porous coating and the absorbent material. This play though typically becomes a further source of noise, causing an increase in high frequency acoustic radiation (greater than 1 kHz), if it is excessive.

A compromise has therefore been studied between:
  a relatively high level of play as mentioned above, until this play can be described as creating (at least) one "cavity", with the advantage of easier implementation of the technology in question, in that attachment between the acoustically absorbent material and the porous coating can be separated in this case from that of the acoustically absorbent material on the turbine engine wall, and
  controlling the aforementioned phenomenon of circulation of the fluid flow within such a cavity, which occurs when the relevant acoustic attenuation liner is immersed in a moving fluid and a new source of noise is subsequently created.

Thus, the compromise sought aims to reconcile a desired ease of industrial implementation with control of the new source of harmful noise that it can generate.

Applied to an acoustic attenuation liner designed for installation on an aircraft turbine engine wall, in contact with a fluid flow, a solution provided for as part of this compromise is that in this case the mesh structure has (or is defined by) wires separating openings through said structure from each other, the constraint of which is that:
  some of these openings have, in a flat configuration, a minimum elementary surface area So such that a circle 0.05 mm in diameter can be drawn therearound and
  at least one said cavity is present, established therefore between the acoustically absorbent material and the porous coating, with this cavity having a volume (Vcav), such as Vcav>3% (Vcav+Vabs), (Vabs) being the volume of the acoustically absorbent material.

Surface area (in m2) means a planar area and a measurement of this area.

Section (in m) means a section perpendicular to the main direction in which the element in question extends.

"Flat" mesh structure (in the expression: "openings passing through said structure, some of which, in a flat configuration, . . . ") means that the structure and therefore the latter's opening(s) involved is(are) to be considered spread out flat, hence according to a plane, whereas functionally it/they is/are curved to define the expected profiled surface (refer to diagrams in the accompanying drawings).

In order to concentrate dimensioning of the cavity with reference to the porous coating, which would be trickier if it were a coating in block form within which the mesh structure were to develop in the direction of the depth or thickness of the block, it is proposed that the porous coating adopt the form of a porous membrane, i.e. a wall with a thickness significantly less than 1 cm and preferably less than 0.5 cm.

Such a thin porous coating will save space and simplify integration of mesh sizes.

Two directions have subsequently been specifically defined in order to dimension the mesh structure adopted in practice.

In a first solution, it is proposed that perpendicular to the predicted main direction of propagation of the acoustic wave towards said liner, this mesh structure should have, at least for the most part and when flat, wires of section(s) Sf such as Sf<0.13 mm, wherein these wires each separate from each other two openings respectively of said elementary surface area S0 such that S0<0.01 mm$^2$.

Favourably and particularly—but therefore not necessarily—the openings with the minimum elementary surface area S0 indicated will each have dimensions (or lengths), L1 and L2, in two perpendicular directions, such as L1<0.1 mm and L2<0.1 mm, to within 5-10%.

Indeed, using a woven fabric, the weave of which may be square, with a wire diameter of less than 0.13 mm and neither of the two perpendicular distances of which defining its front surface, between two successive parallel wires, is greater than 0.1 mm, will guarantee an efficient result.

Indeed, the technical effect, achieved with these dimensional constraints of elementary surface area S0 (at least minimum as indicated) and/or of said dimensions L1 and L2, is that the friction of the fluid flowing over the wires of the porous coating produces sufficient pressure drops to prevent flow of this fluid through the coating which becomes impermeable to aerodynamic flow while remaining permeable to acoustic waves. The restriction on the wire diameter minimises the roughness of the material and therefore improves draining of the fluid on either side of the liner profile.

Moreover, in order to optimally balance the desired frictions and acoustic wave permeability, it has even been defined that, preferably, at least for the most part, said openings with an elementary surface area S0 will be such that S0>0.0025 mm$^2$, each with, again preferably, dimensions, L1 and L2 mentioned above such as L1>0.05 mm and L2>0.05 mm, all to within 5-10%.

In a second solution, it has been attempted to reduce the acoustic resistivity of the porous coating in order to maximise the action of the absorbent material inside the liner in question. Indeed, in this solution, it is proposed to optimise dimensioning of the openings with regard to the orientation of flow in contact with said coating.

More specifically, while the fluid flow which is to pass through the liner propagates in a main direction, it is proposed in this case that the mesh of said structure be finer:
near the stop point at which the fluid flow encounters the porous coating and at which the direction of said flow is normal on the front face of said porous coating receiving it,
than further away from said stop point.

This will therefore result in a coating with a variable mesh size, finer in principle in the areas in which the flow is normal to the porous membrane (close therefore to the stop point).

For the same purpose, it is also proposed that, if a membrane with a mesh structure is used, curved to a rounded apex, in a direction of curvature and defined by wires oriented in different directions in order to display said mesh openings between them, this membrane is such that when flat, between two wires crossways to the direction of curvature, it has a dimension Lx as a function of the angle ∝ formed between a tangent to the membrane, for a given section and an axis passing substantially through the said apex and through a median to the acoustically absorbent material, such that: Lx<0.1/sin(∝), to within 5-10%.

Such a range of variation in the alpha angle may lie between 0 and 180°.

Also involved here is an aerodynamic structuring element for acoustic attenuation comprising an aircraft turbine engine wall, installed on and covering the latter locally, the acoustic attenuation liner including all or some of its characteristics presented above.

For a proven useful effect, in terms of a compromise between noise reduction and aerodynamics, the acoustic attenuation liner of such an assembly may favourably define a leading edge for the wall, which will in turn typically define an aerodynamic surface.

Moreover, particularly for the aforementioned variable mesh size solution, it is proposed that on such an assembly thus constituted, the acoustic attenuation liner and the aerodynamic surface wall should jointly have a profile having a chord, which corresponds to the aforementioned axis passing substantially through the said rounded apex and through a median to the acoustically absorbent material.

Thus, the position as well as the shapes and dimensions of the useful elements will be optimised, with regard to the desired effect of reducing the acoustic resistivity of the porous coating, in order to maximise the action of the absorbent material.

Finally, the present invention also relates to a turbine engine for an aircraft comprising said aerodynamic structuring element for acoustic attenuation or said acoustic attenuation liner, including all or some of their characteristics presented above.

This invention is further detailed below and other characteristics and advantages may appear upon reading the following description given by way of non-limiting example and with reference to the appended drawings, described below.

DETAILED DESCRIPTION

Figure 1:
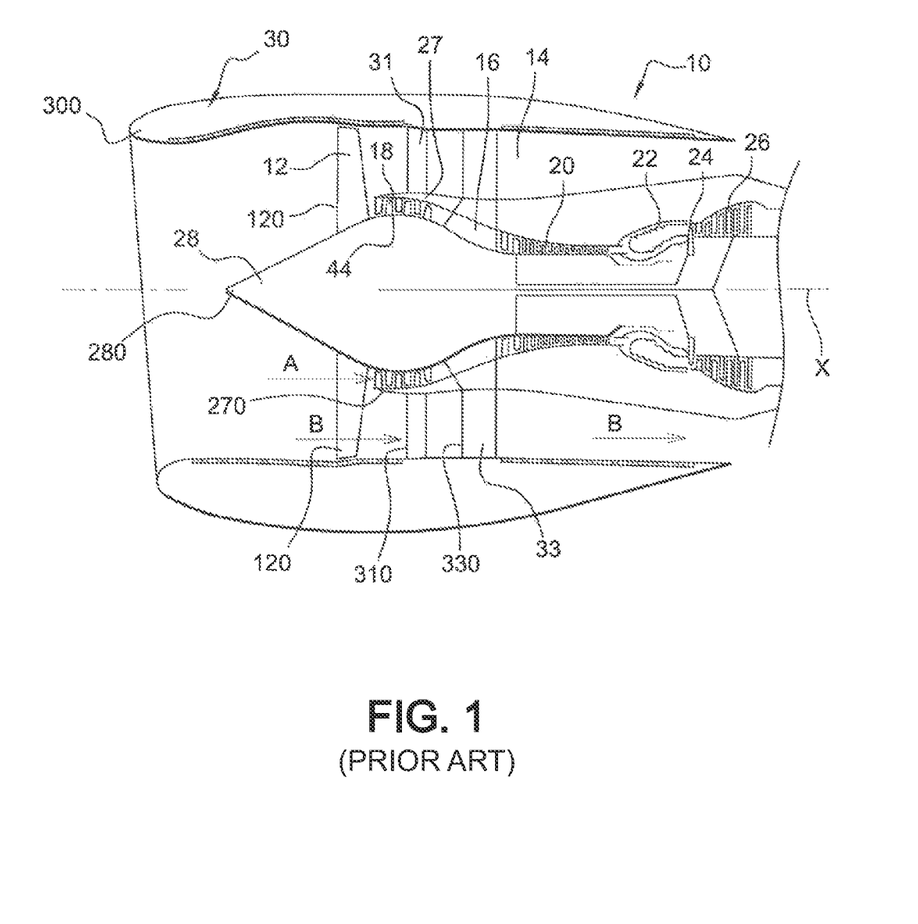
FIG. 1 is a schematic view, in perspective, of a turbine engine according to the known technique.

Reference is made first of all to FIG. 1, which shows a schematic view of an aircraft turbine engine 10, as known, comprising in an upstream-downstream direction, a fan wheel 12, the rotation of which induces acceleration of air in an annular secondary airstream 14 (flow B) surrounding successively, along the X axis of the revolution of the turbine engine around which the wheel 12 rotates, an annular primary air stream 16 (air flow A) flowing into a low-pressure compressor 18, a high-pressure compressor 20, an annular combustion chamber 22, a high-pressure turbine 24 and a low-pressure turbine 26. A wall 27 beginning axially upstream from the low-pressure compressor 18 separates the air flows A and B, at the entrance to the air stream 16 and subsequently serves, downstream, as respectively inner and outer radial limits to the air streams 14 and 16. The fan wheel 12 is located and rotates around the central air inlet cone 28 of the turbine engine. A fairing 30 surrounds the annular secondary air stream 14.

Immediately downstream from the fan wheel 12, in the air stream 14, a radial row of stator blades 31 extends, downstream from which radial linking arms 33 are located, crossing the air stream 14.

An aim of the present invention is to control certain turbine engine noises related in particular to the fact that during operation, the interaction between the fluid flows and the solid parts of the turbine engine are sources of noise that propagate in the surroundings.

One of the means of attenuating a portion of this acoustic radiation is to incorporate an acoustic treatment at the site of surfaces in contact with the sound waves.

Figure 2:
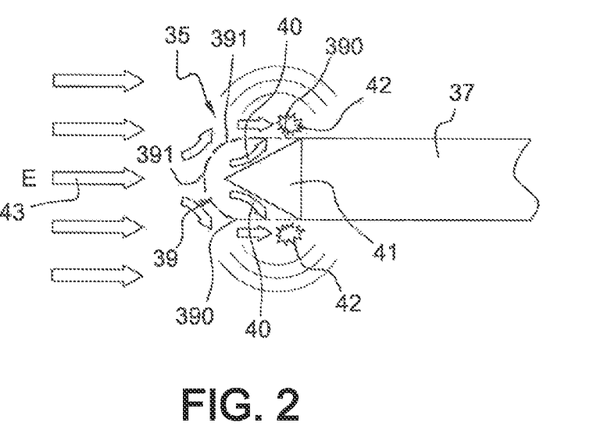
FIG. 2 is a schematic view, in longitudinal section of an acoustic attenuation liner designed to be used in a turbine engine according to FIG. 1.

This is why it is proposed here, as diagrammatically shown particularly in FIG. 2, an acoustic attenuation liner 35 designed to be installed on a wall 37 of an aircraft turbine engine, such as that 10 mentioned above, in contact with a fluid flow E.

Among the areas that can be "treated" with the liner 35, one may mention the tip 280 of the central air intake cone 28, the air intake lip 300 of the fairing 30, the leading edges 310,330 of the stator blades 31 and the radial arms 33, respectively, or the leading edges 120, 270 of the fan wheel 12 and the wall 27, respectively.

As can be seen in particular in FIGS. 2-6, the acoustic attenuation liner 35 comprises:
- a porous coating 39 with a mesh structure and
- an acoustically absorbent material 41 covered with the porous coating 39.

The acoustically absorbent material 41, which can be considered as having a first volume Vabs, may be for example:
- a porous material of the rock, glass or basalt type, or a plastic-based foam (polyethylene, metal and/or ceramic foam, etc.), or
- a material with acoustic cavities of the Aeronautical treatment type (SDOF, DDOF, 2DOF . . . and/or with active or semi-active acoustic treatment.

With regard to the porous coating 39, even though it could be defined by a block with a mesh structure, it is advisable that it be a membrane or a thin wall a few millimetres thick having such a structure. It may be a woven wire cloth. The cloth does not need to be particularly fine. Nevertheless, since a component subject to a flow is involved, it is desirable to observe a roughness criterion of RA<0.8 to limit the loss of propulsion efficiency.

As already mentioned, a significant aspect of the invention in this context is to have dimensioned the porous coating 39 in such a way as to prevent the aforementioned phenomenon of recirculation of the flow inside this coating and thus avoid the internal flow 40 in FIG. 2 from inducing additional acoustic disturbances 42.

Figure 3:
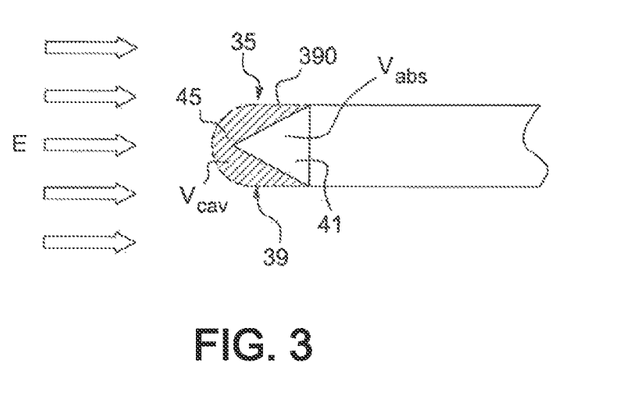
FIG. 3 is another view of FIG. 2 showing the volume Vcav (void volume) hatched to identify the limits therefore, in embodiments.
Figure 4A:
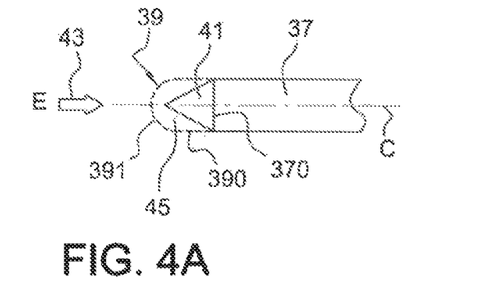
FIG. 4A is a schematic view, in longitudinal section, of an acoustic attenuation liner, in embodiments.
Figure 4B:
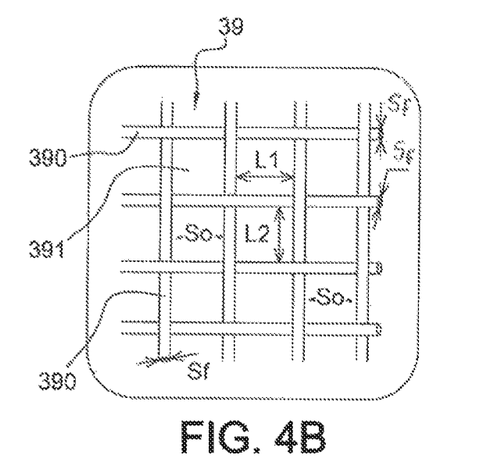
FIG. 4B is a front view of a porous coating, when flat, in embodiments.

In fact, it has been noticed that such a phenomenon occurs when there is a cavity 45 of a volume Vcav (void volume between the porous coating 39 and the absorbent material 41 in FIG. 3) large enough in relation to the total volume between the porous coating and its support (i.e. the sum of the volume of the cavity Vcav and the volume of the absorbent material Vabs).

The inventors have discovered however that a compromise could be found between friction of the fluid E flowing over the wires 390 of the porous coating by producing sufficient pressure drops to prevent the flow of this fluid through the coating, which then becomes impermeable to aerodynamic flow and a permeability to the acoustic waves received, which then remains sufficient, with this compromise being reached:

if the volume Vcav is such that: Vcav>3% (Vcav+Vabs),
and if the openings 391 in the mesh structure, which separate the wires 390 from each other and which pass through said structure have, at least for some thereof and when flat, a minimum elementary surface area So such that a circle 0.05 mm in diameter can be drawn therearound.

The passage of fluid depends in fact on the shape of the section S0. It can be imagined that an extremely long opening can have a large section. If however it is also extremely fine, the flow will not be able to pass through. Indeed, it has even been found that the following specificities applied to the wires 390 of the porous coating 39 ought to minimise the roughness of the mesh structure and promote drainage of the flow E on either side of the profile of the liner 35 in question, as show diagrammatically in FIGS. 4A and 4B, in a first embodiment a mesh structure having, at least for the most part and when flat (as is the case of the portion illustrated), perpendicular to the predicted main direction 43 of propagation of the fluid E, wires 390 with cross-section(s) (diameter(s) as in this case) Sf such as Sf<0.13 mm and openings 391 (individually):
- in said elementary surface area S0 such as S0<0.01 mm$^2$, or
- having, for at least the majority thereof and still in an assumed flat state, dimensions L1 and L2 such that L1<0.1 mm and L2<0.1 mm, all to within 5-10%.

Preferably, in order to optimally balance the desired friction and permeability to the acoustic waves, openings 391 such as S0>0.0025 mm$^2$ will be defined, each with, once again preferably and for at least the majority thereof, dimensions, L1 and L2, in two perpendicular directions, such as L1>0.05 mm and L2>0.05 mm, all to within 5-10%. Hence, when flat, the openings 391 may each be rectangular.

In the example, the wires 390 are supposed to define rectangular, preferably square, openings 391. Thus, with wires divided into mutually perpendicular rows and columns, as in the example, the effects produced by the chosen mesh can be balanced in both directions.

A homogeneous mesh solution, as above, will simplify the embodiments and homogenise the behaviours (of the membrane or thin wall) of the porous coating 39, even if this coating will actually in principle be curved, as illustrated diagrammatically, in the manner of a convex wall towards the flow E (therefore concave towards the acoustically absorbent material 41 in the example) and consequently its meshes facing the flow E in the direction 43 will then be curved in the centre and flat(ter) at the ends.

In practice, the (membrane or thin wall of the) porous coating 39 will be aerodynamically profiled.

In the example shown in the diagram, it was considered that this (the membrane or thin wall of the) porous coating 39 defines a leading edge for wall 37, frontally. In this case, the acoustic attenuation liner 35 and the aerodynamic wall 37 may in particular jointly have a profile having a chord C (FIG. 4A), with the installed assembly being considered as receiving the flow E parallel to the chord C.

Provision may also be made for at least one alternative to the aforementioned homogeneous mesh solution.

Figure 5A:
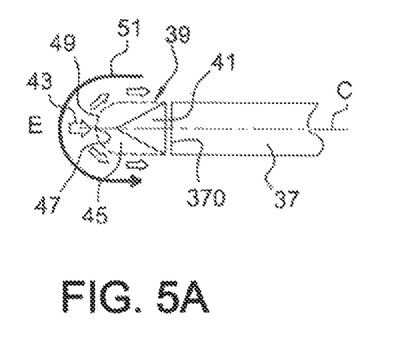
FIG. 5A is a schematic view, in longitudinal section, of an acoustic attenuation liner, in embodiments.
Figure 5B:
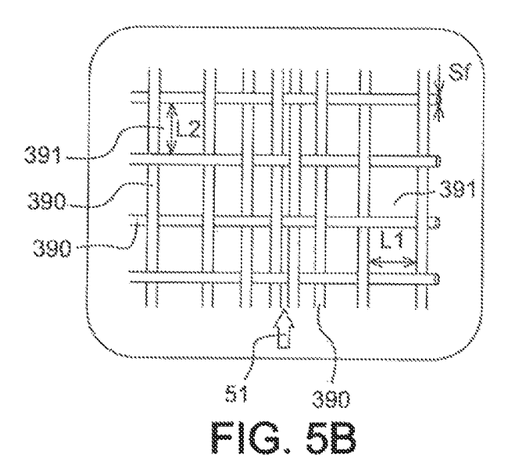
FIG. 5B is a front view of a porous coating, when flat, in embodiments.
Figure 6:
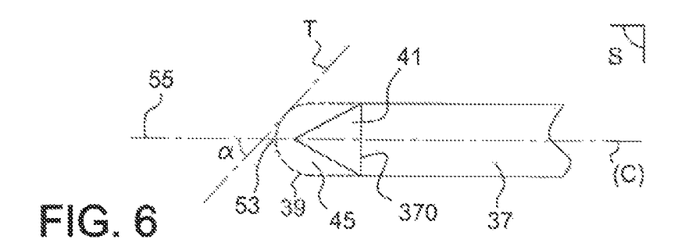
FIG. 6 is a schematic view, in longitudinal section, of an acoustic attenuation liner, in embodiments.

Thus, as in the example below and as shown in FIGS. 5A, 5B and 6, one may seek to maximise the action of the absorbent material 41 by reducing the acoustic resistivity of the porous coating 39 by optimising the dimensioning of the openings 391 with regard to the orientation of the flow E in contact with the coating.

It is in fact a matter of equipping the porous coating 39 with a mesh tighter than elsewhere in the area 49 (FIGS. 5A and 5B; closer dotted lines) where the direction 43 of flow E is normal on the front face of the porous coating 39 receiving it; i.e. close to the stop point, referenced 47 in the example. By adjusting the density of the wires 390 in this manner such that this density is maximum in the environment 49 of the stop point and looser elsewhere, in particular minimum when the flow E reaches the porous coating 39 parallel to the latter (to its outer surface), the desired effect will be achieved while maximising propagation of the acoustic waves to the absorbent material 41.

Specifically, in the example shown, it is proposed to parameterize, in at least one direction (dimension L1), the opening 391, therefore the distance between two successive wires 390, perpendicularly to the direction 51 of curvature, as a function of the angle formed between the chord C and a tangent T, for the section (section of the constant-radius profile) S in question.

In the example, this is achieved with a membrane 39 with a mesh structure that is curved, in the direction of curvature 51, to a rounded apex 53, which is located in this case on the chord C, therefore coinciding with the stop point, referenced 47. The wires 390 may have the aforementioned section (diameter) Sf.

For said section S in question (parallel to the axis 55 mentioned below), the membrane 39 is specific in this case in that it has, at least predominately and still in an assumed flat state, between two wires 390 crossways to the direction of curvature 51, a dimension Lx (in this case L1) which is a function of the angle $\alpha$ formed between a tangent T to the membrane and the axis 55 passing substantially through the apex 47 and by a median of the acoustically absorbent material 41, such that: $Lx<0.1/\sin(\alpha)$, to within 5-10%.

In the preferred example adopted, the axis 55 and said median coincide with the chord C.

Given the expected structuring effects and with acoustic attenuation, without altering the aerodynamics, the acoustically absorbent material 41, which (as in other cases) is applied against the edge 370 to be treated of the wall 37, is convex in this case towards the cavity 45 and thus the porous coating 39. Its possible pointed shape will be noted, which is easy to produce and effective.

Indeed, it will have been possible to produce an aerodynamic structuring assembly for acoustic attenuation comprising a wall 37 of an aircraft turbine engine and installed thereon, with the acoustically absorbent material 41 applied to its front surface 370, the acoustic attenuation liner 35 with all or some of its above-mentioned characteristics.

It should also be noted that by providing the porous coating or membrane 39 with the appropriate structure, it will be possible to obtain a fabric that is both impermeable to the flow E and permeable to propagation of the acoustic waves. Furthermore, with the second embodiment, it will be possible to optimise propagation of the acoustic waves while retaining the characteristic of impermeability to flow.

The invention claimed is:

1. An acoustic attenuation edge designed to be installed on an aircraft turbine engine wall, in contact with a fluid flow, the acoustic attenuation edge comprising:
   a porous coating (39) having a mesh structure,
   an acoustically absorbent material (41) covered with the porous coating and having a first volume (Vabs), and
   at least one cavity (45) located between the acoustically absorbent material (41) and the porous coating (39),
   wherein the mesh structure has wires (390) separating between them mesh openings (391) passing through said mesh structure,
   wherein:
   each of the mesh openings (391) has an elementary surface area (So), some of the mesh openings (391) are large enough to include a circle 0.05 mm in diameter,
   said at least one cavity (45) has a second volume (Vcav), as the second volume is higher than three percent of a sum of the first volume and the second volume (Vcav>3% (Vcav+Vabs)),
   the fluid flow is to pass through the acoustic attenuation edge while propagating in a main propagation direction (43), the acoustic attenuation edge has a stop point (47) at which the fluid flow encounters the porous coating (39) and at which the main propagation direction (43) of said flow is normal to a front face of said porous coating (39) receiving said flow, and
   the mesh openings are smaller near the stop point (47) than further away from said stop point.

2. The acoustic attenuation edge according to claim 1, wherein the mesh structure forms a porous membrane.

3. The acoustic attenuation edge according to claim 1, wherein each of the wires (390) have a wire width extending between two adjacent mesh openings (391), at least 50% of the wire widths (Sf) are lower than 0.13 mm.

4. The acoustic attenuation edge according to claim 3, wherein said elementary surface areas (S0) are lower than 0.01 mm².

5. The acoustic attenuation edge according to claim 4, wherein, more than 50% of the elementary surface areas (S0) are greater than 0.0025 mm².

6. The acoustic attenuation edge according to claim 5, wherein each of said mesh openings define a rectangle having an opening length (L1) and an opening width (L2), the opening length (L1) and the opening width (L2) are higher than 0.05 mm.

7. The acoustic attenuation edge according to claim 1, wherein each of the mesh openings (391) define a rectangle having an opening length (L1) and an opening width (L2), the opening length (L1) and the opening width (L2) are each lower than 0.1 mm.

8. The acoustic attenuation edge according to claim 7, wherein, more than 50% of the elementary surface areas (S0) are greater than 0.0025 mm².

9. An aerodynamic structuring assembly for acoustic attenuation comprising a wall (37) and, installed on said wall, the acoustic attenuation edge according to claim 1.

10. The aerodynamic structuring assembly according to claim 9, wherein the acoustic attenuation edge (35) defines a leading edge for the wall.

11. The aerodynamic structuring assembly according to claim 9, wherein said wall is located at the position of one of the following areas of the aircraft turbine engine:
    a tip (280) of a central air intake cone (28),
    a leading edge (120) of a fan wheel (12),
    an air intake lip (300) of a fairing (30) surrounding an annular secondary air stream (14,B) successively surrounding, along an axis (X) of revolution of the turbine engine around which the fan wheel (12) rotates, an annular primary air stream (16,A) flowing into a low-pressure compressor (18), a high-pressure compressor (20), an annular combustion chamber (22), a high-pressure turbine (24) and a low-pressure turbine (26),
    leading edges (310) of stator blades (31),
    leading edges (330) of radial arms (33),
    a leading edge (270) beginning axially upstream from the low-pressure compressor (18) and allowing a separation of air between the annular primary air stream (16, A) and annular secondary air stream (14,B), at the annular primary air stream (16, A).

12. An aircraft turbine engine comprising:
the aerodynamic structuring assembly for acoustic attenuation according to claim 9.
13. An acoustic attenuation edge designed to be installed on an aircraft turbine engine wall, in contact with a fluid flow, the acoustic attenuation edge comprising:
a porous coating (39) having a mesh structure,
an acoustically absorbent material (41) covered with the porous coating and having a first volume (Vabs), and
at least one cavity (45) located between the acoustically absorbent material (41) and the porous coating (39),
wherein the mesh structure has wires (390) separating between them mesh openings (391) passing through said mesh structure,
wherein
each of the mesh openings (391) has an elementary surface area (So), some of the mesh openings (391) are large enough to include a circle 0.05 mm in diameter, and
said at least one cavity (45) has a second volume (Vcav), the second volume is higher than three percent of a sum of the first volume and the second volume (Vcav>3% (Vcav+Vabs)),
the mesh structure forms a porous membrane and the porous membrane having the mesh structure:
is curved to a rounded apex, in a direction (51) of curvature,
has said wires (390) oriented in different directions in order to display said mesh openings (391) between them, and
displays, if considered in a lay flat condition, between two of said wires crossways to said direction of curvature:
a dimension Lx which is as a function of an angle $\propto$ formed between a tangent to the porous membrane, for a given section, and
an axis (55) passing through said rounded apex and through a median to the acoustically absorbent material (41) and Lx<0.1 mm/sin($\propto$).
14. The acoustic attenuation edge according to claim 13, wherein:
the fluid flow is to pass through the acoustic attenuation edge while propagating in a main propagation direction (43), the acoustic attenuation edge has a stop point (47) at which the fluid flow encounters the porous coating (39) and at which the main propagation direction (43) of said flow is normal to a front face of said porous coating (39) receiving said flow,
the mesh openings are smaller near the stop point (47) than further away from said stop point.
15. An aerodynamic structuring assembly for acoustic attenuation:
comprising a wall (37) of an aircraft turbine engine and, installed on said wall, the acoustic attenuation edge according to claim 13, which covers said wall locally, and,
wherein the acoustic attenuation edge (35) and the wall (37) jointly have a profile having a chord (2), which corresponds to said axis passing through said rounded apex and through a median to the acoustically absorbent material.
16. The aerodynamic structuring assembly according to claim 15, wherein said wall is located at the position of one of the following areas of the aircraft turbine engine:
a tip (280) of a central air intake cone (28),
a leading edge (120) of a fan wheel (12),
an air intake lip (300) of a fairing (30) surrounding an annular secondary air stream (14,B) successively surrounding, along an axis (X) of revolution of the turbine engine around which the fan wheel (12) rotates, an annular primary air stream (16,A) flowing into a low-pressure compressor (18), a high-pressure compressor (20), an annular combustion chamber (22), a high-pressure turbine (24) and a low-pressure turbine (26),
leading edges (310) of stator blades (31),
leading edges (330) of radial arms (33),
a leading edge (270) of a wall (27) beginning axially upstream from the low-pressure compressor (18) and allowing a separation of air between the annular primary air stream (16, A) and annular secondary air stream (14,B), at the annular primary air stream (16, A).
17. An aircraft turbine engine comprising:
a wall; and
an acoustic attenuation edge installed on the wall and in contact with fluid flow, including:
a porous coating (39) with a mesh structure,
an acoustically absorbent material (41) covered with the porous coating and having a first volume (Vabs), and
at least one cavity (45) located between the acoustically absorbent material (41) and the porous coating (39),
wherein the mesh structure has wires (390) separating between them mesh openings (391) passing through said mesh structure,
and wherein:
each of the mesh openings (391) has an elementary surface area (So), some of the mesh openings (391) are large enough to include a circle 0.05 mm in diameter, and
said at least one cavity (45) has a second volume (Vcav), the second volume is higher than three percent of a sum of the first volume and the second volume (Vcav>3% (Vcav+Vabs)),
the fluid flow is to pass through the acoustic attenuation edge while propagating in a main propagation direction (43), the acoustic attenuation edge has a stop point (47) at which the fluid flow encounters the porous coating (39) and at which the main propagation direction (43) of said flow is normal to a front face of said porous coating (39) receiving said flow,
the mesh openings are smaller near the stop point (47) than further away from said stop point.
18. The aircraft turbine engine of claim 17, further comprising at least one of:
(a) the mesh structure forms a porous membrane;
(b) the wires (390) have a wire width extending between two adjacent mesh openings (391), at least 50% of the wire widths (Sf) are lower than 0.13 mm;
(c) said elementary surface areas (S0) are lower than 0.01 mm$^2$;
(d) each of the mesh openings (391) define a rectangle having an opening length (L1) and an opening width (L2), the opening length (L1) and the opening width (L2) are lower than 0.1 mm;
(e) more than 50% of the elementary surface areas (S0) are higher than 0.0025 mm$^2$;
(f) as the opening lengths (L1) are higher than 0.05 mm and the opening widths (L2) are higher than 0.05 mm;
(g) the mesh structure:
is curved to a rounded apex, in a direction (51) of curvature,
has said wires (390) oriented in different directions in order to display said mesh openings (391) between them, and displays, between two of said wires crossways to said direction of curvature:
a dimension Lx which is as a function of an angle $\alpha$ formed between a tangent to the porous membrane, for a given section, and
an axis (55) passing through said rounded apex and through a median to the acoustically absorbent material (41) and $Lx<0.1/\sin(\alpha)$.

* * * * *